W. C. FARNUM.
LAWN-MOWER.
No. 188,788. Patented March 27, 1877.
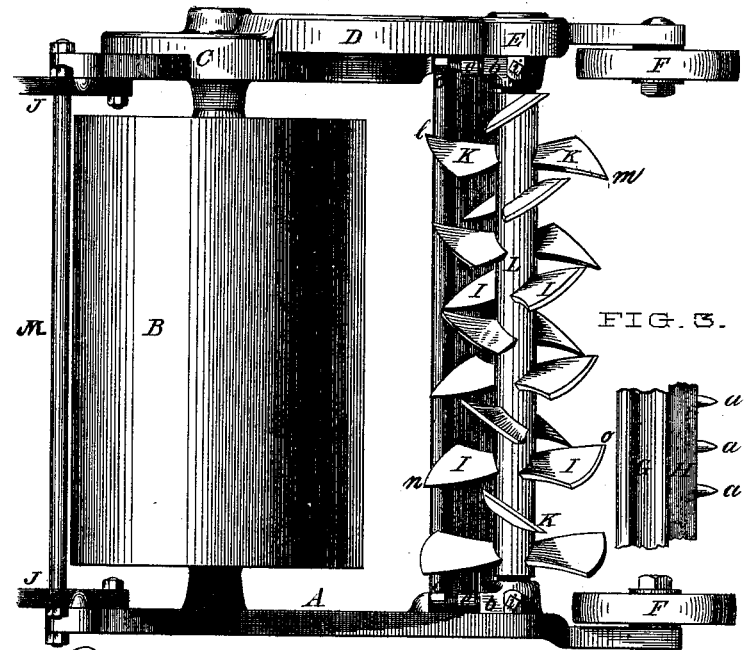

UNITED STATES PATENT OFFICE.

WILLIAM C. FARNUM, OF HOOSICK FALLS, NEW YORK, ASSIGNOR OF ONE-HALF HIS RIGHT TO LYMAN WILDER, OF SAME PLACE.

IMPROVEMENT IN LAWN-MOWERS.

Specification forming part of Letters Patent No. 188,788, dated March 27, 1877; application filed January 10, 1877.

*To all whom it may concern:*

Be it known that I, WILLIAM C. FARNUM, of the village of Hoosick Falls, in the county of Rensselaer and State of New York, have invented certain new and useful Improvements in Lawn-Mowers, which improvements are fully set forth in the following specification, reference being had to the accompanying drawings, in which—

Figure 1 represents a plan view of the machine. Fig. 2 represents a side elevation of the same on the left-hand side of the machine. Fig. 3 represents a plan view of a portion of the front bar or frame of the machine, attached to which is a ledger-blade, H, to which ledger-blade are fastened, on the under side, fingers *a*.

Similar letters of reference in the several figures refer to similar parts.

The nature and object of this invention is to provide a lawn-mower which can be used to cut grasses on lawns or other grounds where grasses are required to be cut for the purpose of keeping the said lawns in good condition—that is, a green and even-cut surface—without regard to the crop to be derived from the cutting of the same.

I am aware that lawn-mowers are in use which cut lawns sufficiently where the grass has grown only to a short height, and when these machines are pushed or drawn over the ground, if the grass is not too high, the spiral cutters, acting against the ledger-plate, will cut the grass and leave a smooth lawn; but if the grass is too high, or extends above the ledger-plate to any great distance, (which is apt to occur in any lawn,) the revolving spiral cutters will push the grass away from the ledger-plate, and the forward motion of the machine will press the grass down, and the cutters, instead of bringing the grass to be cut off, will press it away from the ledger-plate, and the machine will slide over it and leave a stubble of long grass lying upon the ground, with its seed ends in the direction of the path of the machine, which the next day rise up to tell the story—that the lawn-mower had cut a portion of the grass and rolled down another portion, and thus a part of the lawn presents a bad appearance; also, in times of great drouth the grass of a lawn will not spring up sufficiently uniform in height to admit of cutting with a lawn-mower, but weeds and some spindling stalks of grass will get so tall that ordinary lawn-mowers will not cut the same and leave the surface smooth. With a machine made according to these specifications any lawn which, under any circumstances, may have grown up, however tall the grass or weeds may be, can be cut and produce a satisfactory result, show a uniform stubble, and leave behind its movement no spears of grass or weeds pressed down to rise up to say, "The lawn-mower did not do its work." And, with a proper development of parts, I believe the system of cutters can be made available for a mowing or reaping machine for harvesting purposes where the crop is to be secured; but, as this application is only for a lawn-mower, I leave the harvester to a future application.

A, Fig. 1, represents one side of the main frame, and C represents the opposite side thereof. These two sides A and C are connected together at their front ends by the bar G, and at their rear ends by the bar M. B is a drum or roller, which extends nearly across the machine between the side pieces A and C, and fitted in suitable bearings thereon. The drum B rolls upon the ground when the machine is propelled or drawn forward, and by means of suitable gearing gives motion to the cutters, as will be more fully hereinafter described. The side pieces A and C extend forward of the cutters, and at their front ends are attached, upon suitable bearings, the wheels F F. These wheels roll upon the ground, and support the front part of the machine. Upon the end of the shaft which is the axis of the drum B is fastened a gear-wheel, which gears into a center or connecting gear, D, and which gears into another pinion, E, on the end of the shaft which carries the cutters. L is a shaft, with which a series of cutters, K K and I I, are fastened. H is a ledger-plate, made of steel or other suitable substance, which presents a straight cutting-edge, against which the cutters K K and I I revolve, and is so arranged as to be made adjustable by the set-screws $b$ and $e$ at each end, so as to bring the cutting edge into a proper relative position to the cutting-edge of the revolving cutters K K and I I. The series of cutters K K and I I are arranged radially to the axis of the shaft L. I prefer to make the series of cutters K K and I I in sections, and slip the sections on the shaft L; but they may be made so that each one of the cutters K K and I I can be screwed into the shaft L, or fastened thereto by any well-known mechanical means.

In Fig. 1 the points $l$ and $m$ represent the extreme points of one pair of the cutters K K. The points $n$ and $o$ represent the extreme points of one pair of cutters I I. Each pair of cutters K K and I I is located radially on the shaft L, and on opposite sides thereof. The several pairs of cutters K K and the several pairs of cutters I I are each located spirally along the line of the length of the shaft L, with reference to the circumference of the shaft L.

On the under side of the ledger-blade H are fastened, at suitable intervals, fingers $a$, which fingers serve to hold up the portions of grass to be cut, and keep them from being pushed by the revolution of the cutters longitudinally along the ledger-blade before it is cut, and thus leave it either uncut altogether or cut with too high a stubble, and also to protect the ledger-blade from being injured in passing over an uneven surface. These fingers are located on the ledger-blade at a point determined by the revolution of the points $l$ and $m$ of the cutters K K and the points $n$ and $o$ of the cutters I I. The whole of the revolving cutters are made with cutting-edges, which strike spirally across the edge of the ledger-blade, and can be ground like the ordinary cutters in the lawn-mower, so that all points in the cutting-edge, when the shaft L is made to revolve, will describe a cylinder. One wing of any pair of cutters K K is so arranged that when the shaft L is made to revolve it will cut from right to left, and pass across the ledger-blade between one pair of fingers, $a$ $a$, while the opposite wing of the same pair of cutters K K will cut from left to right, and pass across the ledger-blade between the same pair of fingers. The same is true of the several pairs of cutters I I. Thus it will be seen that each pair of cutters cuts alternately in different directions, and the cutting-edges of the revolving cutters, being made short, present a somewhat broken surface to the face of the uncut grass, and thus allow the grass to stand vertically between the cutters. At the rear end of the frame can be attached handles J J, by means of which the operator can propel the machine; or any other suitable device can be arranged to draw the machine by horse-power or otherwise.

The methods heretofore employed in cutting grass for harvesting purposes have been various in their devices. Some have tried the rotary cutter. Some have tried the shear principle of cutting against a ledger-plate. All these devices have failed. The scalloped cutter reciprocating through fixed slotted guard-fingers has been generally adopted by manufacturers, and is a practical and successful device for harvesting-machines where the crop is to be secured.

The spiral knife, rotating against a ledger-plate, has been generally adopted in lawn-mowers. Where the grass has to be cut for the purpose of securing the crop, the grass has arrived at a degree of ripeness and strength of stalk to oppose sufficient resistance to the motion of the knife to render the scalloped reciprocating cutter and slotted guard-finger a practical device, and to cut a very low and even stubble; but when the grass is young and tender it will not oppose sufficient resistance to the scalloped cutter; but the grass will be bent away by the cutters, and will not be cut sufficiently low and smooth to produce a good appearance upon a lawn. For this reason the spiral cutter rotating against a ledger-plate has been generally adopted in lawn-mowers. Now, by my arrangement, as set forth in this specification, it will be seen that, while the cutter acts spirally against the ledger-plate, each cutter acts only upon a very small portion of the ledger-plate, and cuts in one direction, while its mate or opposite cutter cuts over the same surface of the ledger-plate in the opposite direction, so that the result obtained in cutting grass is really the same as the result in the reciprocating cutter and slotted guard arrangement, and is equally efficient in ripe or unripe grass, whether it be long or short, and the construction of the cutters is such that they will enter the tall grass, and bring it to the ledger-plate and cut it off, while a continuously-spiral cutter, as heretofore made, pushes the grass away from the cutter.

The operation of the machine is as follows: When pushed or drawn over the ground, a portion of the machine supported by the drum B and the weight of the drum B itself causes the drum B to revolve, and, by means of suitable gearing, as heretofore described, imparts a rotary motion to the cutter-shaft L. The fingers $a$, projecting into the grass, hold the grass up, while the series of spiral-shaped revolving cutters, K K and I I, strike diagonally into the grass, press it against the ledger-plate, and cut it off alternately like shears, first in one direction and then in the other, between the fingers $a$ $a$.

Having thus fully described my invention, what I claim as new, and desire to secure by Letters Patent, is—

1. A series of overhung rotating cutters, in combination with a ledger plate or blade, substantially as described.

2. The combination of a series of rotating cutters, I I and K K, with the ledger-blade H, when said rotating cutters cut against small portions of the ledger-plate at one time, a part of the cutters cutting in one direction, the other in the other direction, substantially as described.

3. The combination, in a lawn-mower, of a series of revolving spiral cutters, a ledger-plate to cut against, and fingers projecting into the material to be cut to sustain the same, substantially as described.

W. C. FARNUM.

Witnesses:
 J. RUSSELL PARSONS,
 C. V. N. SHARPE.